(12) United States Patent
Chen et al.

(10) Patent No.: US 10,645,343 B2
(45) Date of Patent: May 5, 2020

(54) VIDEO WINDOW DISPLAY METHOD AND APPARATUS

(71) Applicant: Alibaba Group Holding Limited, Grand Cayman (KY)

(72) Inventors: Jingchang Chen, Zhejiang (CN); Yi Liu, Zhejiang (CN); Xiaoliang Guo, Zhejiang (CN)

(73) Assignee: Alibaba Group Holding Limited, George Town, Grand (KY)

( * ) Notice: Subject to any disclaimer, the term of this patent is extended or adjusted under 35 U.S.C. 154(b) by 0 days.

(21) Appl. No.: 16/324,889

(22) PCT Filed: Aug. 1, 2017

(86) PCT No.: PCT/CN2017/095393
§ 371 (c)(1),
(2) Date: Feb. 11, 2019

(87) PCT Pub. No.: WO2018/028465
PCT Pub. Date: Feb. 15, 2018

(65) Prior Publication Data
US 2019/0335141 A1    Oct. 31, 2019

(30) Foreign Application Priority Data

Aug. 12, 2016  (CN) .......................... 2016 1 0663716

(51) Int. Cl.
*H04N 7/14* (2006.01)
*H04N 7/15* (2006.01)
*G09G 5/38* (2006.01)
(52) U.S. Cl.
CPC ............... *H04N 7/152* (2013.01); *G09G 5/38* (2013.01); *G09G 2354/00* (2013.01)
(58) Field of Classification Search
CPC ....................................................... H04N 7/14
See application file for complete search history.

(56) References Cited

U.S. PATENT DOCUMENTS 5,915,091 A * 6/1999 Ludwig .................. G06Q 10/10
                                                       348/E7.081
7,634,540 B2 * 12/2009 Ivashin .................. G06Q 10/10
                                                       348/14.01
(Continued)

FOREIGN PATENT DOCUMENTS

CN    101080000 A    11/2007
CN    105306868 A    2/2016
CN    105791738 A    7/2016

OTHER PUBLICATIONS

Translated PCT International Search Report dated Oct. 19, 2017 for PCT application No. PCT/CN2017/095393, 2 pages.
(Continued)

*Primary Examiner* — Olisa Anwah
(74) *Attorney, Agent, or Firm* — Lee & Hayes, P.C.

(57) ABSTRACT

A video window method and apparatus are provided by the present disclosure, wherein the method may include: during a video communication process, displaying video windows corresponding to at least a portion of communication participants in an associated display region on a video communication page; and upon detecting a display configuration operation with regard to an arbitrary communication participant, sending a window configuration instruction to all communication participants, causing video windows corresponding to the arbitrary communication participant to be displayed in display regions on communication devices employed by all communication participants. By technical solutions of the present disclosure, video communication pages of all communication participants of a video communication may be unilaterally managed, so that all participants may focus on a video window of a designated communication participant at the same time, facilitating improvement of interaction efficiency in video communication.

19 Claims, 21 Drawing Sheets

(56) References Cited

U.S. PATENT DOCUMENTS

| | | | |
|---|---|---|---|
| 9,049,338 B2* | 6/2015 | Witt | H04L 1/0083 |
| 2003/0144004 A1 | 7/2003 | Canova, Jr. et al. | |
| 2004/0179036 A1* | 9/2004 | Teplov | G06F 3/1454 |
| | | | 715/751 |
| 2006/0164508 A1* | 7/2006 | Eshkoli | H04N 7/147 |
| | | | 348/14.09 |
| 2007/0291108 A1* | 12/2007 | Huber | H04N 7/15 |
| | | | 348/14.02 |
| 2008/0130525 A1* | 6/2008 | Jansen | H04N 7/17318 |
| | | | 370/260 |
| 2013/0293667 A1* | 11/2013 | Guduru | G06F 3/1454 |
| | | | 348/14.12 |
| 2014/0267571 A1* | 9/2014 | Periyannan | H04N 7/15 |
| | | | 348/14.08 |
| 2015/0109399 A1* | 4/2015 | Kuscher | H04N 7/15 |
| | | | 348/14.02 |
| 2015/0334313 A1* | 11/2015 | Chougle | H04N 7/152 |
| | | | 348/14.07 |

OTHER PUBLICATIONS

Translated PCT Written Opinion dated Oct. 19, 2017 for PCT application No. PCT/CN2017/095393, 3 pages.

* cited by examiner

PRIOR ART

PRIOR ART

VIDEO WINDOW DISPLAY METHOD AND APPARATUS

CROSS REFERENCE TO RELATED PATENT APPLICATIONS

This application claims priority to and is a national phase of PCT Patent Application No. PCT/CN2017/095393, filed on Aug. 1, 2017, which claims priority to Chinese Patent Application No. 201610663716.9, filed on Aug. 12, 2016 and entitled "VIDEO WINDOW DISPLAY METHOD AND APPARATUS", which are incorporated herein by reference in their entirety.

TECHNICAL FIELD

The present disclosure relates to the technical field of communications, and particularly to conversation window display methods and apparatuses.

BACKGROUND

Upon the basis of traditional voice communication, related technology has set forth video communication. Video communication, by a communication venue of providing voice and video to communication participants, and particularly by obtaining video windows corresponding to all communication participants and the display of these video windows on video communication pages of communication devices employed by each communication participant, promotes a stronger sense of intimacy between the communication participants that is closer to actual face-to-face interaction.

However, in related technology, video communication pages of communication devices employed by each communication participant cannot be unilaterally managed, which is detrimental for high-efficiency interactions in a video communication procedure.

SUMMARY

In view of this, the present disclosure provides a video window display method and apparatus, enabling video communication pages of all communication participants of a video communication to be unilaterally managed, so that all participants may focus on a video window of a designated communication participant at the same time, facilitating improvement of interaction efficiency in video communication.

To achieve the above-mentioned objectives, the present disclosure provides the following technical solutions:

According to the present disclosure, a video window display method is set forth, including:

During a video communication process, displaying video windows corresponding to at least a portion of communication participants in an associated display region on a video communication page; and Upon detecting a display configuration operation with regard to an arbitrary communication participant, sending a window configuration instruction to all communication participants, causing video windows corresponding to the arbitrary communication participant to be displayed in display regions on communication devices employed by all communication participants.

According to the present disclosure, a video window display method is set forth, including:

During a video communication process, displaying video windows corresponding to at least a portion of communication participants in an associated display region on a video communication page; and Upon receiving a window configuration instruction sent by a particular communication participant with regard to an arbitrary communication participant, displaying a video window corresponding to the arbitrary communication participant in the display region.

According to the present disclosure, a video window display method is set forth, including:

Establishing a video communication, causing communication devices employed by communication participants to display video communication pages, video windows corresponding to at least a portion of communication participants being displayed in associated display regions on the video communication pages; and Upon receiving a window configuration instruction sent by a particular communication participant with regard to an arbitrary communication participant, forwarding the window configuration instruction to other communication participants aside from the particular communication participant, causing video windows corresponding to the arbitrary communication participant to be displayed in display regions on communication devices employed by the other communication participants.

According to the present disclosure, a video window display apparatus is set forth, including:

A displaying unit configured to, during a video communication, display video windows corresponding to at least a portion of communication participants in an associated display region on a video communication page; and A sending unit configured to, upon detecting a display configuration operation with regard to an arbitrary communication participant, send a window configuration instruction to all communication participants, causing video windows corresponding to the arbitrary communication participant to be displayed in display regions on communication devices employed by all communication participants.

According to the present disclosure, a video window display apparatus is set forth, including:

A displaying unit configured to, during a video communication process, displays video windows corresponding to at least a portion of communication participants in an associated display region on a video communication page; and An adjusting unit configured to, upon receiving a window configuration instruction sent by a particular communication participant with regard to an arbitrary communication participant, display a video window corresponding to the arbitrary communication participant in the display region.

According to the present disclosure, a video window display apparatus is set forth, including:

An establishing unit configured to establish a video communication, causing communication devices employed by communication participants to display video communication pages, video windows corresponding to at least a portion of communication participants being displayed in associated display regions on the video communication pages; and A forwarding unit configured to, upon receiving a window configuration instruction sent by a particular communication participant with regard to an arbitrary communication participant, forwards the window configuration instruction to other communication participants aside from the particular communication participant, causing video windows corresponding to the arbitrary communication participant to be displayed in display regions on communication devices employed by the other communication participants.

By the above-mentioned technical solutions, the present disclosure, by unilateral management of video windows, enables video windows of an arbitrary communication participant to be displayed in master display regions of all communication participants, so that all participants may focus on these video windows, and interaction content among all communication participants is targeted to a greater extent, helping to improve interaction efficiency of communication participants in a video communication procedure.

DETAILED DESCRIPTION

Figure 1:
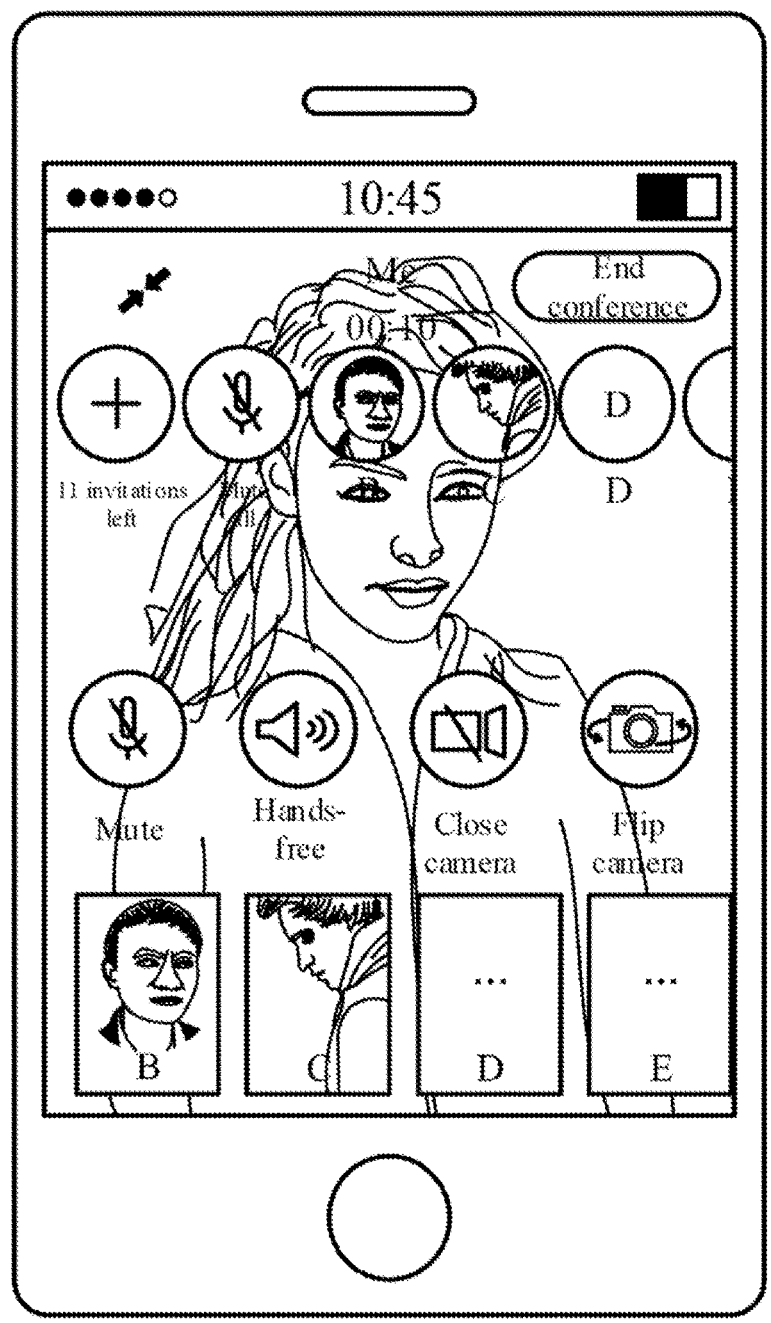
FIG. 1 is a diagram of a video communication page in related technology.

Suppose that video communication is implemented between user A, user B, user C, user D, user E, user F, and user G. FIG. 1 illustrates a video communication page on a communication device employed by user A, the video communication page including multiple display regions within, such as a background region of a video window utilized to display user A (that is, "me"), rectangular regions utilized to display user B, user C, and such other communication participants, and the like.

Due to display space of a video communication page being finite, display regions of the video communication page are finite in number. For example, FIG. 1 contains only five display regions (a background region and four rectangular regions), causing the number of users participating in video communication to often exceed the number of display regions, resulting in video windows of only some of the users being displayable in the display regions at the same time, while video windows of the other users will not be displayed on the video communication page.

Of course, user A may manually change the video windows displayed in the display region. For example, a ribbon-shaped region is established near the top of FIG. 1, and within the ribbon-shaped region from left to right, the function keys "11 invitations left" and "Mute all" are displayed sequentially, as well as user identifiers corresponding to user B, user C and the like. Of course, because display area of the video communication page is finite, only part of a user identifier corresponding to user E is shown, and user identifiers corresponding to user F and user G are hidden. However, user A may, by left-dragging upon the above-mentioned ribbon-shaped region, thereby reveal the temporarily hidden user identifiers corresponding to user E, user F, and user G. Thus, user A may, by a click, trigger, for example, the user identifier corresponding to user F, causing a video window of an arbitrary user among user A to user E (which may be selected by user A, or determined based on a preset order) to be replaced with a video window of user F.

Figure 2:
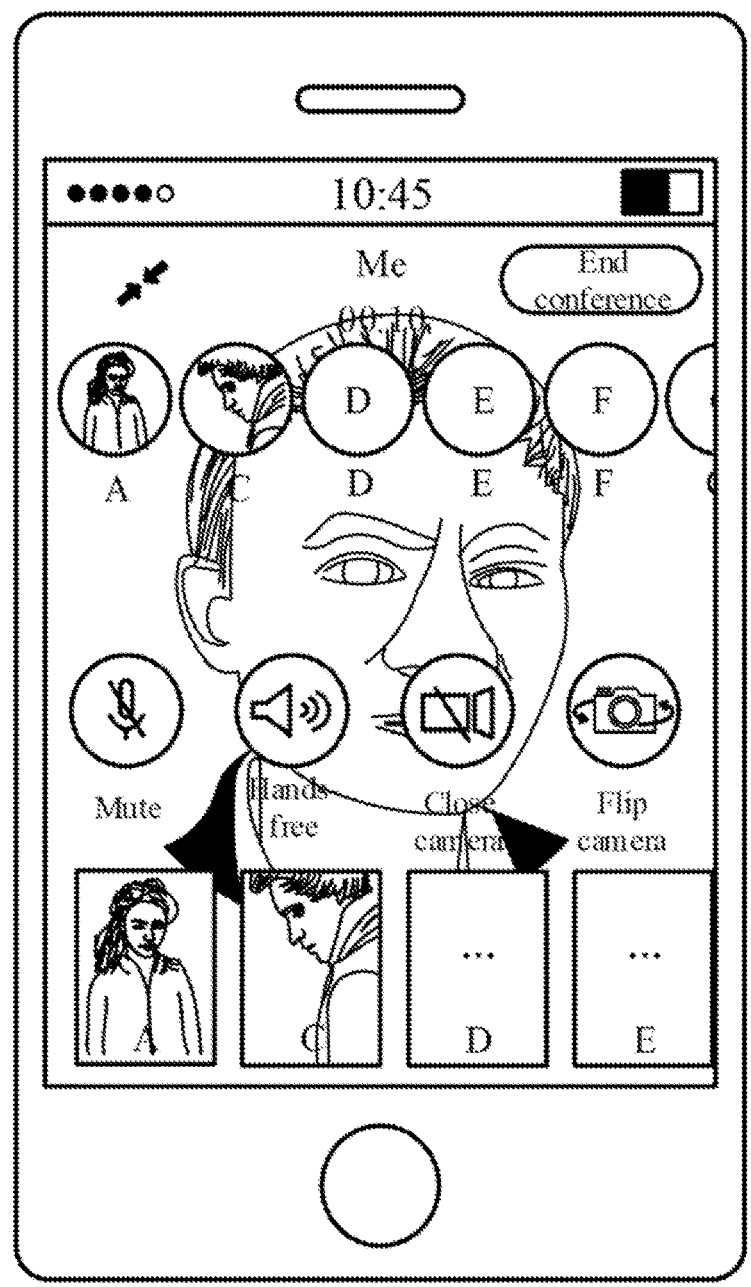
FIG. 2 is a diagram of a video communication page in related technology.

However, in related technology, the adjustment of video windows is mutually independent. That is, when user A adjusts the video window of user F into the display region, on, for example, a video communication page on a communication device employed by user B as illustrated by FIG. 2, a video window of user F is not displayed in the display region unless user B manually adjusts it into the display region.

In some settings, users often wish to implement unilateral video window management over all communication participants. For example, when starting up internal video conferencing in a corporation, a dozen or more corporate personnel members may participate at the same time. Then, when some corporate personnel member speaks, it is desired for all communication participants to display video windows of the personnel member in display regions, to obtain an optimal conference experience. However, not all corporate personnel members are willing to manually perform region adjustment, and even if all corporate personnel members are willing to manually perform region adjustment, due to a comparatively high number of communication participants, each corporate personnel member is required to identify and select the speaking member, which may even force the conference process to become delayed or interrupted, producing a decline in communication efficiency.

By way of another example, in a one-on-one video communication setting between counterparties, sometimes, to facilitate interaction, the counterparties need to display a same video window in display regions. But, if there is some communication participant A who does not know how to adjust the video window, the other communication participant B may need to remotely verbally guide A to perform operations. However, A may be unable to understand the remote guidance of B, and interruption of video communication is bound to result even if A is able to understand, resulting in a decline in communication efficiency.

Figure 3:
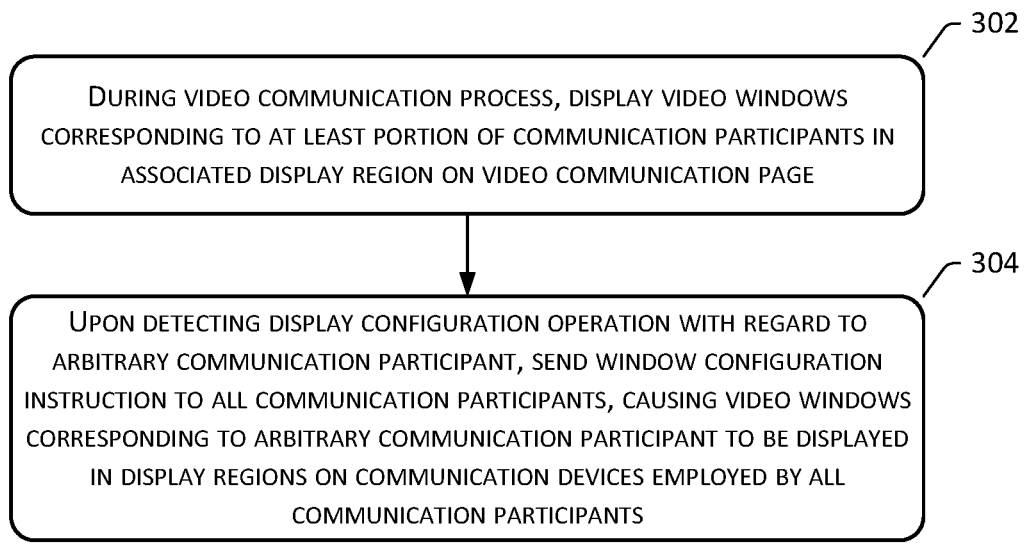
FIG. 3 is a flowchart of a video window display method based at a controlling party terminal provided by an example embodiment of the present disclosure.

Therefore, the present disclosure may solve the above-mentioned problems of the related technology through unilateral configuration of video windows. To further describe the present disclosure, the following examples are provided:

FIG. 3 is a flowchart of a video window display method based at a controlling party terminal provided by an example embodiment of the present disclosure. As illustrated by FIG. 3, the method is utilized on a communication device employed by a communication participant acting as a controlling party, and may include the following steps:

Step 302, during a video communication process, displaying video windows corresponding to at least a portion of communication participants in an associated display region on a video communication page.

According to the present example embodiment, the display region may include a master display region and a slave display region, such that the above-mentioned video windows corresponding to at least a portion of communication participants may be respectively displayed in the master display region and the slave display region. Herein, the master display region may have an area larger than the slave display region, so as to be able to visually attract interest of communication participants to a greater extent, and also convenience communication participants in viewing display content of associated video windows, facilitating improvement of communication efficiency.

According to an example embodiment, the master display region may be a central region of the video communication page, and the slave display region may be an edge region of the video communication page, so that the master display region is situated in a region of visual interest of the video communication page, so as to be able to visually attract interest of communication participants to a greater extent, facilitating improvement of communication efficiency.

According to another example embodiment, the master display region may be a background region of the video communication page, and the slave display region may be an edge region of the video communication page. For example, as illustrated by FIGS. 1-2, the background region may be equivalent to the entire video communication page in area, and may maximize viewing convenience for communication participants. Since the background region is situated a layer below the slave display region, it will therefore not impact displaying in the slave display region.

Step 304, upon detecting a display configuration operation with regard to an arbitrary communication participant, sending a window configuration instruction to all communication participants, causing video windows corresponding to the arbitrary communication participant to be displayed in display regions on communication devices employed by all communication participants.

According to the present example embodiment, a video window corresponding to an arbitrary communication participant may be displayed in an arbitrary display region; herein, when display regions include a master display region and a slave display region, the video window corresponding to the arbitrary communication participant may be displayed in the master display region, facilitating video communication participants obtaining optimal visual experiences.

According to the present example embodiment, each video window corresponding to a communication participant may be utilized to display at least one of the below-mentioned items of information: a video image captured by a communication device employed by an associated communication participant, such as a frontal image of the communication participant captured by a front camera of the communication device, or another image captured by a rear camera of the communication device, and the like, or an image captured by an independent camera external to the communication device; screen display content of the communication device; and a contact portrait of the associated communication participant.

Figure 4:
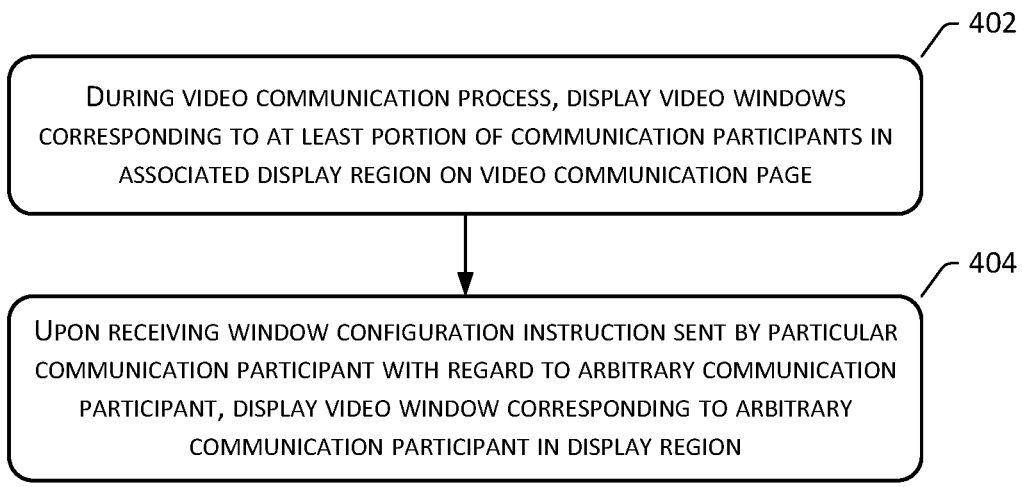
FIG. 4 is a flowchart of a video window display method based at a controlled party terminal provided by an example embodiment of the present disclosure.

FIG. 4 is a flowchart of a video window display method based at a controlled party terminal provided by an example embodiment of the present disclosure. As illustrated by FIG. 4, the method is utilized on a communication device employed by a communication participant acting as a controlled party, and may include the following steps:

Step 402, during a video communication process, displaying video windows corresponding to at least a portion of communication participants in an associated display region on a video communication page.

Step 404, upon receiving a window configuration instruction sent by a particular communication participant with regard to an arbitrary communication participant, displaying a video window corresponding to the arbitrary communication participant in the display region.

According to the present example embodiment, when a display region includes a master display region and a slave display region, the video window corresponding to the arbitrary communication participant may be displayed in the master display region, achieving optimal visual experiences. Of course, users may switch the display of each video window between the master display region and the slave display region.

According to an example embodiment, upon receiving a window configuration instruction, the communication device may force the video window corresponding to the arbitrary communication participant to be displayed in the display region, particularly in settings such as corporate conferencing and the like, improving management effectiveness.

According to another example embodiment, upon receiving the window configuration instruction sent by the particular communication participant with regard to an arbitrary communication participant, a window display prompt is displayed; then, upon the window display prompt being responded to, a video window corresponding to the arbitrary communication participant is displayed in the display region. According to this example embodiment, by displaying the window display prompt, a selecting opportunity may be provided to the associated user, enabling the user to determine whether the video window corresponding to the arbitrary communication participant needs to be displayed in the display region, based on actual needs of the user.

According to the present example embodiment, upon receiving the window configuration instruction, if the video window corresponding to the arbitrary communication participant is in the display region, a display state associated therewith is maintained; if the video window corresponding to the arbitrary communication participant is not in the display region, then display contents in the display region are switched to the video window corresponding to the communication participant, replacing the original display contents of the display region. Herein, if the video window corresponding to the arbitrary communication participant is in the slave display region, and the video window corresponding to the arbitrary communication participant needs to be displayed in the master display region, then display may be switched between the video window corresponding to the arbitrary communication participant and the video window originally displayed in the master display region.

According to the present example embodiment, upon detecting a display switching operation with regard to another communication participant, display contents in the display region may be switched to the video window corresponding to the other communication participant, replacing the video window corresponding to the arbitrary communication participant, such that in a unilateral management setting, a communication participant acting as a controlled party may still manually adjust display contents of the display region.

Herein, to ensure favorable outcomes for video communication, any of the below-mentioned conditions may be set up, so that in the case where any of the below-mentioned conditions are satisfied, operations removing the video window corresponding to the arbitrary communication participant from the display region are restricted: a duration of continuous display of the video window corresponding to the arbitrary communication participant in the display region does not reach a preset duration—for example, display may be forced for at least 20 minutes; a restriction lifting instruction for the video window corresponding to the arbitrary communication participant sent by the particular communication participant has not been received—that is, the display of the video window corresponding to the arbitrary communication participant must be manually lifted by the particular communication participant; the arbitrary communication participant has not exited the video communication. Of course, the present disclosure shall not be limiting thereto.

Figure 5:
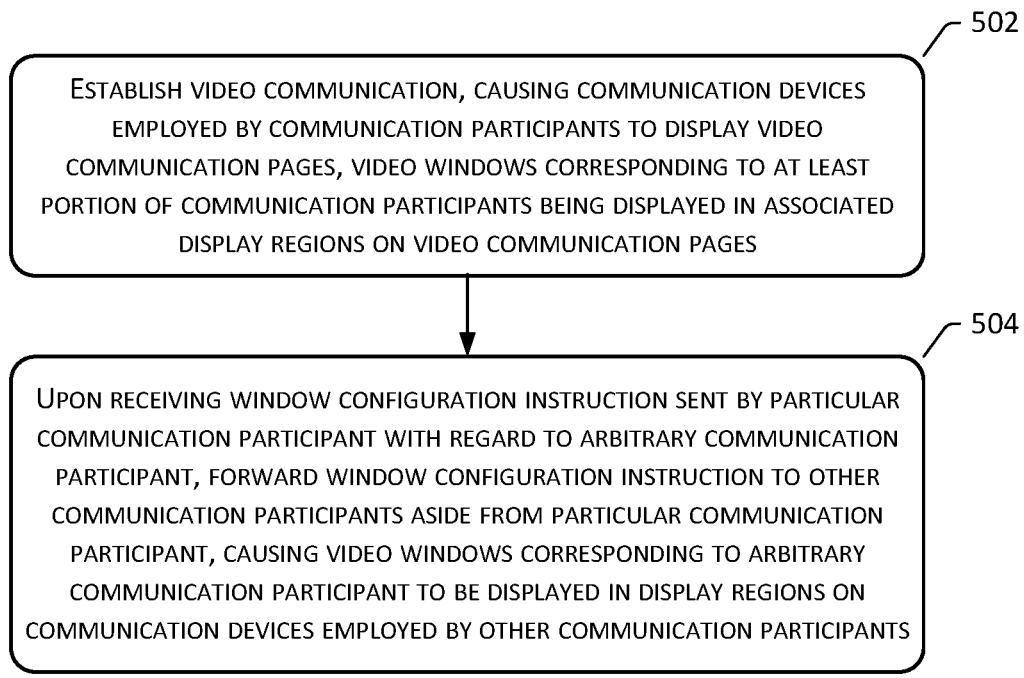
FIG. 5 is a flowchart of a video window display method based at a server terminal provided by an example embodiment of the present disclosure.

FIG. 5 is a flowchart of a video window display method based at a server terminal provided by an example embodiment of the present disclosure. As illustrated by FIG. 5, the method is utilized on a server, and may include the following steps:

Step 502, establishing a video communication, causing communication devices employed by communication participants to display video communication pages, video windows corresponding to at least a portion of communication participants being displayed in associated display regions on the video communication pages.

Step 504, upon receiving a window configuration instruction sent by a particular communication participant with regard to an arbitrary communication participant, forwarding the window configuration instruction to other communication participants aside from the particular communication participant, causing video windows corresponding to the arbitrary communication participant to be displayed in display regions on communication devices employed by the other communication participants.

According to the present example embodiment, a window configuration instruction is utilized to perform unilateral management over all communication participants, and thus the identity of the sending party of the window configuration instruction may be restricted. For example, the particular communication participant acting as the sending party may be restricted to an initiating party of the video communication.

According to the present example embodiment, when the display regions include a master display region and a slave display region, the video window corresponding to the arbitrary communication participant may be displayed in master display regions on the communication devices employed by the other communication participants, obtaining optimal video experiences.

Figure 6:
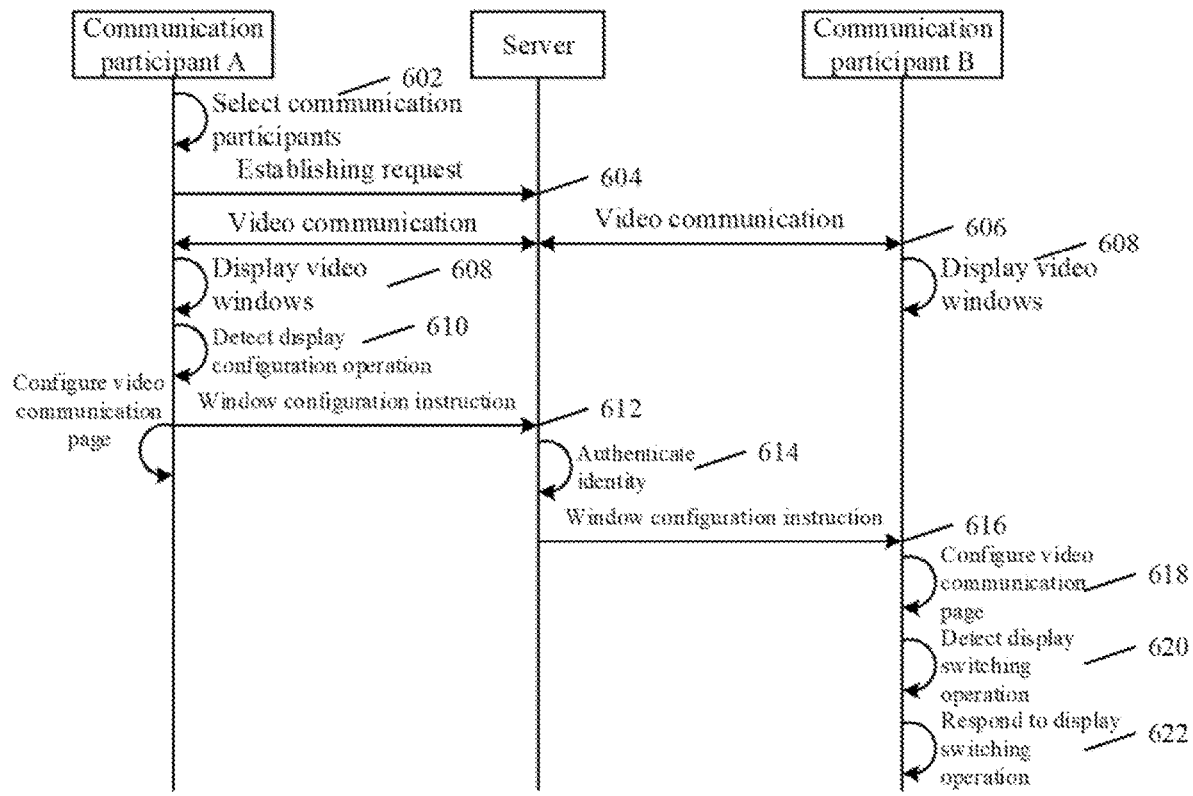
FIG. 6 is a flowchart of a video window display method provided by an example embodiment of the present disclosure.

To facilitate understanding, below, a video window unilateral management scheme shall be described in detail with regard to three-way data exchange between a controller party, a controlled party, and a server, with reference to FIG. 6. Herein, FIG. 6 is a flowchart of a video window display method provided by an example embodiment of the present disclosure. As illustrated by FIG. 6, suppose that communication participant A acts as a controller party, and communication participant B and such other users act as controlled parties (here, only communication participant B is used as an example, omitting other controlled parties; each communication participant acting as a controlled party may make reference to communication participant B herein), and with a video conference between communication participants A, B, and the like as an example, the method may include the following steps:

Step 602, communication participant A selecting communication participants.

According to the present example embodiment, suppose that communication participant A is an initiating party of the video communication. The communication participant A may, through the conference initiation page illustrated by FIG. 7, for example by triggering the "⊕" button on the conference initiation page, select the desired members to be added to the conference such as B, C and the like. Of course, any added members may be removed.

Of course, technical solutions of the present disclosure are not limited to a setting of a video conference between three or more users, and may be likewise applied to one-on-one video communication between counterparties; here, illustrative examples are given for only a video conference setting.

Step 604, the server receiving an establishing request sent by communication participant A.

Step 606, the server implements video communication between A, B and all such communication participants.

Figure 7:
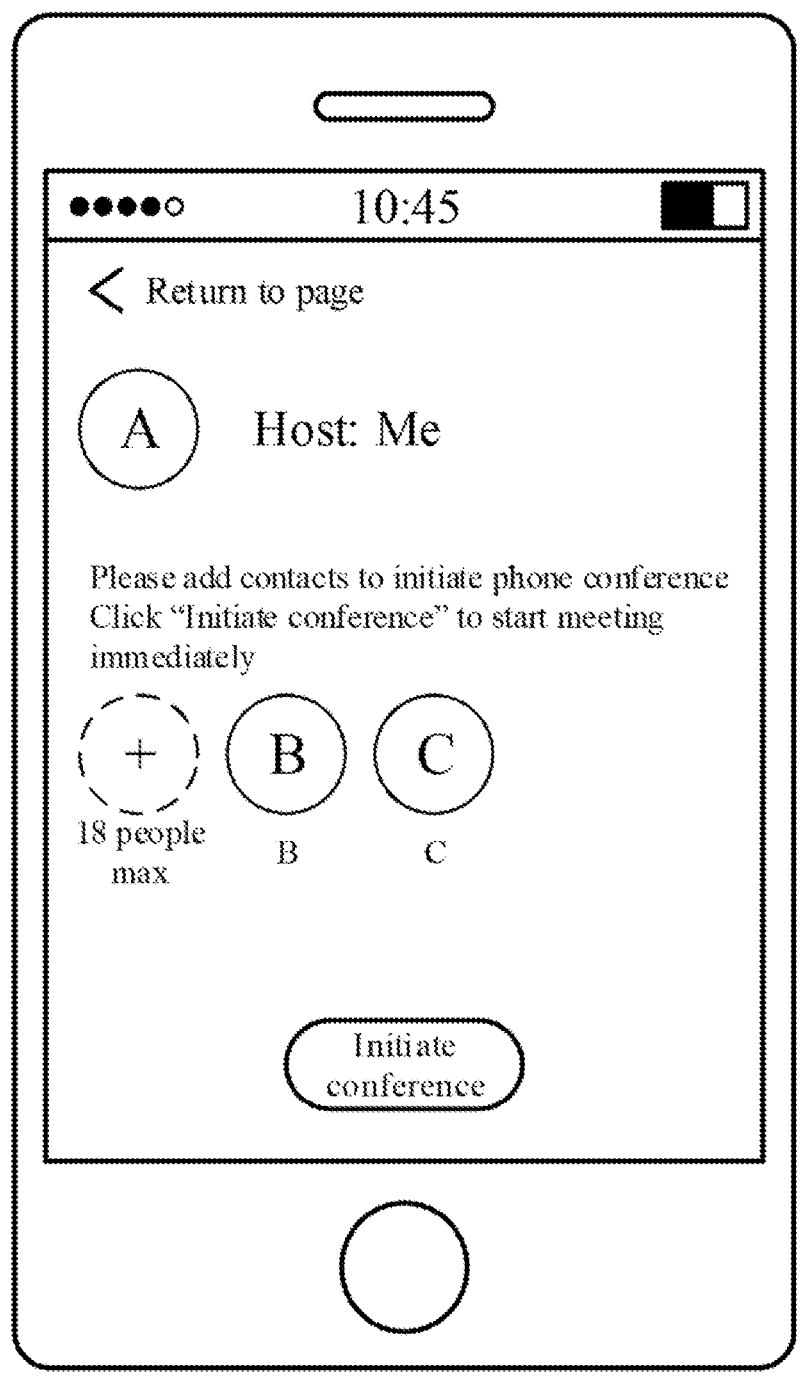
FIGS. 7-12 are diagrams of mobile device video communication pages provided by an example embodiment of the present disclosure.

According to the present example embodiment, after communication participant A completes adding members to the video conference, by clicking an "initiate conference" button as illustrated by FIG. 7, an establishing request may be sent to the server through the communication device employed by the communication participant A; the server may then implement video communication between all communication participants, such as, through reading information of all communication participants contained in the establishing request, establishing a video conference associated therewith.

Step 608, on communication devices employed by each communication participant, respectively displaying video windows corresponding to all communication participants.

Figure 8:
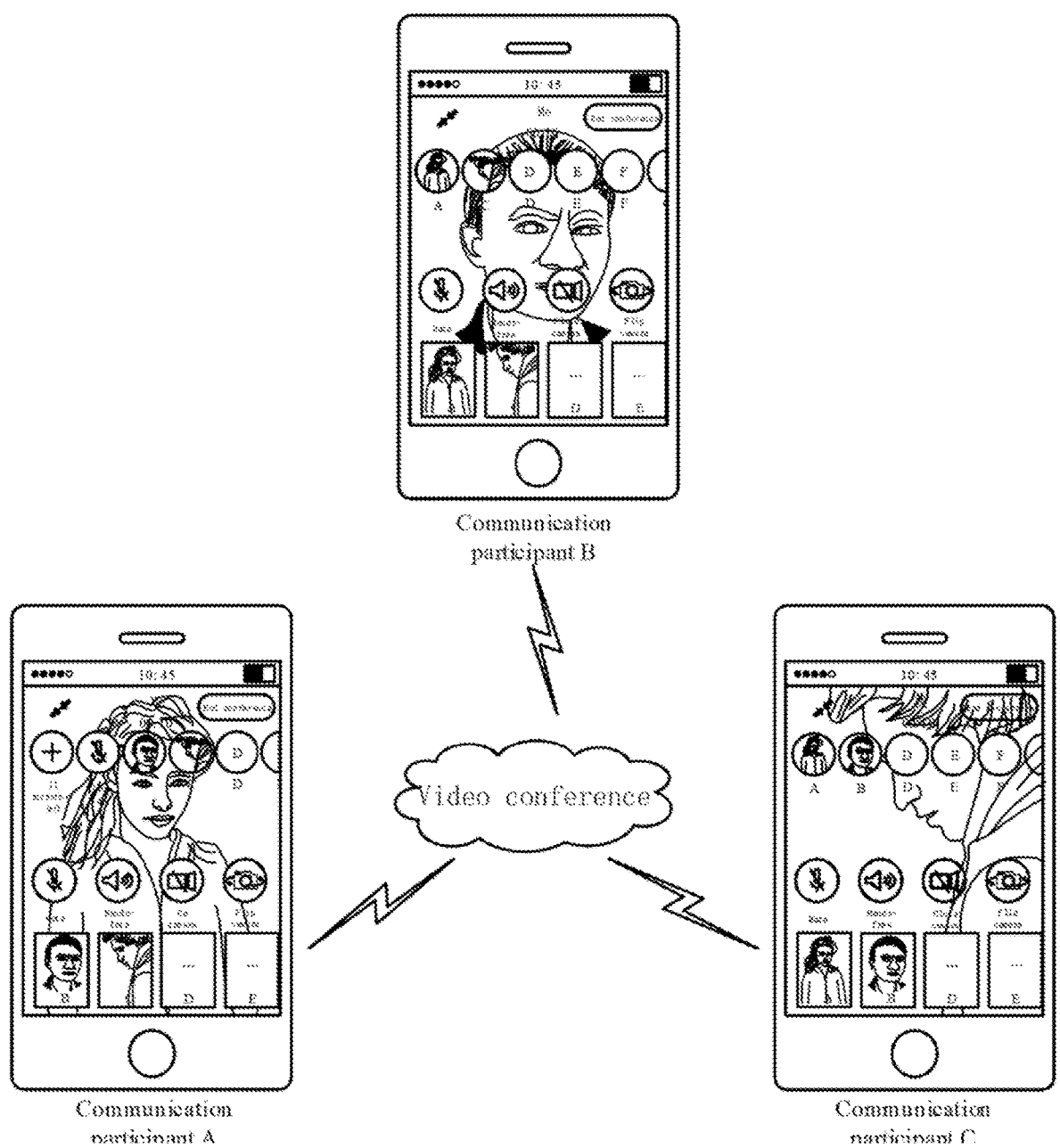

According to the present example embodiment, suppose that a video conference is established between communication participant A, communication participant B and communication participant C. As illustrated by FIG. 8, in a default state, on video communication pages of communication devices employed by each communication participant, a video window of that respective communication participant is displayed in a master display region, and video windows of other communication participants are displayed in slave display regions. For example, on a video communication page of a communication device employed by communication participant A, a video window corresponding to communication participant A is displayed in a master display region (that is, a background region), and video windows corresponding to communication participant B and communication participant C are displayed in slave display regions (that is, two rectangular regions at a lower left corner). On a video communication page of a communication device employed by communication participant B, a video window corresponding to communication participant B is displayed in a master display region (that is, a background region), and video windows corresponding to communication participant A and communication participant C are displayed in slave display regions (that is, two rectangular regions at a lower left corner). On a video communication page of a communication device employed by communication participant C, a video window corresponding to communication participant C is displayed in a master display region (that is, a background region), and video windows corresponding to communication participant A and communication participant B are displayed in slave display regions (that is, two rectangular regions at a lower left corner).

It may be seen that because the area of the master display region is larger than the slave display regions, and possibly even much larger than the areas of the slave display regions, the master display region tends to be more capable of attracting the attention of communication participants. However, because the number of communication participants may be numerous, and the screen size of the communications device is often finite, only one master display region or a finite number of multiple master display regions may be set up, with the remainder only configurable as slave display regions. In FIG. 8, because the master display region is configured as a background region of the video communication page, that is, the master display region covers the entire video communication page, thus only one master display region may be configured, and the slave display regions need to be displayed overlaid on an upper layer to the master display region, partially obstructing the master display region.

However, in a default state illustrated by FIG. 8, display content of master display regions seen by each communication participant are not the same, resulting in differences in points of interest among each communication participant, which is evidently detrimental for interactions and discussions between each communication participant. Suppose that communication participant B is corporate management personnel, and communication participant A and communication participant C are corporate developer personnel. Then, when communication participant B is speaking about project development subject matter, in a default state illustrated by FIG. 8, communication participant A and communication participant C each may only view a video window corresponding to communication participant B in a slave display region at a lower left corner, and attention thereto is easily dispelled. Although each communication participant may manually switch the master display region with slave display regions—for example, upon communication participant C clicking (or by other manners triggering) the video window corresponding to communication participant B, the video window may be switched into the master display region, causing the video window corresponding to communication participant C to be switched into the associated slave display region—learning costs exist to some extent for the switching operation, and not all communication participants may understand, and when different communication participants complete manual switching, completion efficiency may be different, even causing accidental exits from the video conference, resulting in the video conference being delayed or interrupted, and reducing interaction efficiency in the video conference.

Therefore, by the following steps, video windows may be unilaterally configured, to improve interaction efficiency of a video conference:

Step 610, a communication device employed by communication participant A detecting a display configuration operation.

Step 612, in one aspect, the communication device employed by communication participant A sending a window configuration instruction to a server, and in another aspect, the communication device, by executing the window configuration instruction, configuring a video communication page of the communication device.

According to the present example embodiment, communication participant A may, by triggering an arbitrary communication participant, such as by triggering a video window corresponding to an arbitrary communication participant, execute a display configuration operation targeting the arbitrary communication participant. For example, in FIG. 9A, by long-pressing on a video window corresponding to communication participant B, an associated temporary window may be summoned, the temporary window including "mute," "remove from conference," "set as master screen," "everyone look at him/her," "send message," and such function options; of course, because communication participant A is an initiating party of the video conference according to the example embodiment, communication participant A may thereby perform "mute," "remove from conference," and such control operations upon the other conference participants, while when communication participant C executes a same operation, a temporary window shown may not contain "mute," "remove from conference," and such function options. Of course, this does not prevent successful execution of technical solutions of the present disclosure.

Figure 9A:
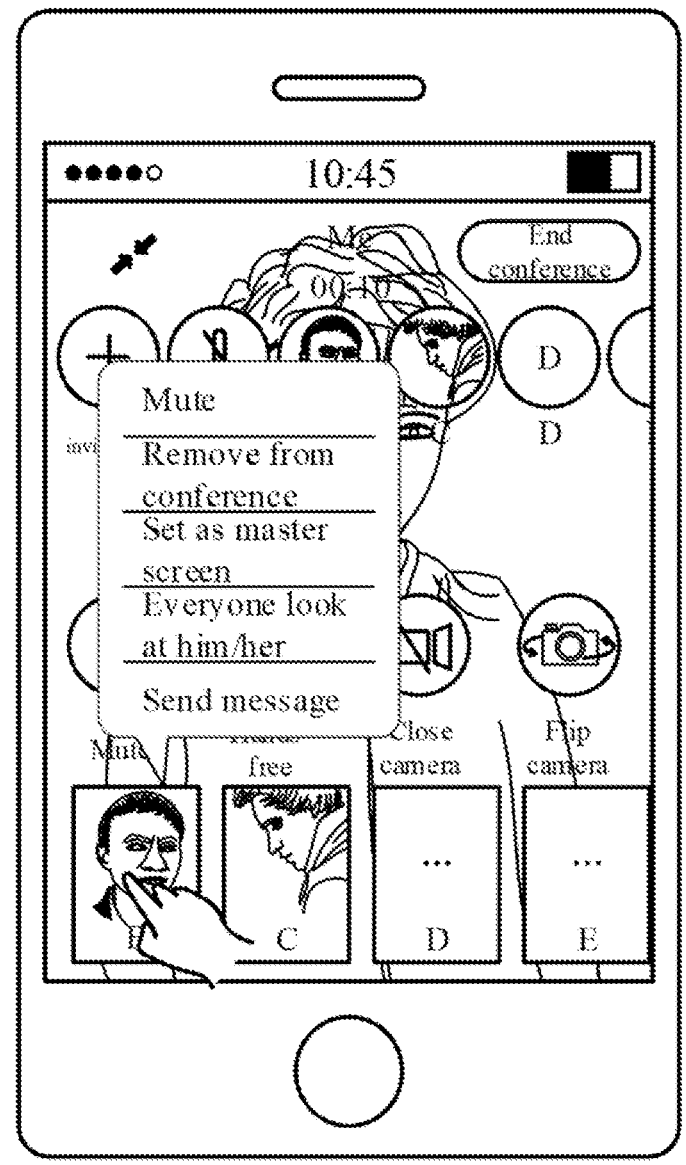
Figure 10:
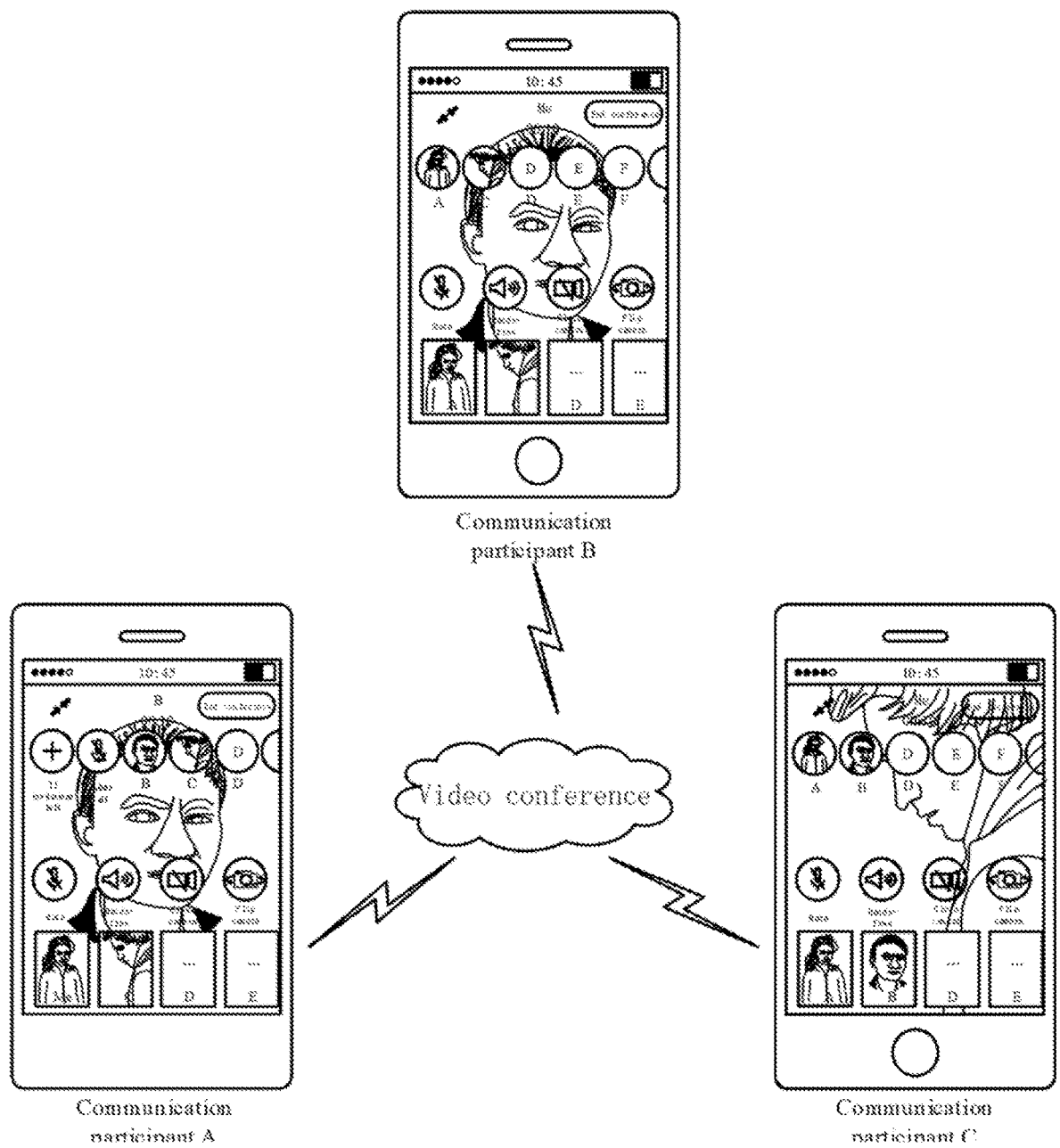

As illustrated by FIG. 9A, when the "set as master screen" function option of the temporary window is triggered, based on the schematic diagram of FIG. 9A of a video communication page of a communication device employed by communication participant A, a video window corresponding to communication participant B may be adjusted into a master display region in the video communication page, causing a video window corresponding to communication participant A to be displayed in a slave display region, that is, the video windows corresponding to communication participant A and communication participant B exchanging display regions. As illustrated by FIG. 10, the adjustment of video windows is accomplished solely on the communication device employed by communication participant A, while no change occurs with regard to communication participant C and such other users.

When the "everyone look at him/her" function option illustrated by FIG. 9A is triggered, the communication device employed by communication participant A interprets this as detecting a display configuration operation, and executes the following operations:

In one aspect, the communication device employed by communication participant A sends an associated window configuration instruction to the server, the window configuration instruction containing information of the triggered communication participant B, such that when the window configuration instruction is forwarded to the other communication participants B and C aside from communication participant A, a receiving party may configure the video window corresponding to communication participant B, causing the video window corresponding to communication participant B to be adjusted into the master display region.

In another aspect, the communication device employed by communication participant A, by executing the window configuration instruction, configures its own video communication page, proactively adjusting the video window corresponding to communication participant B into the master display region.

Figure 11:
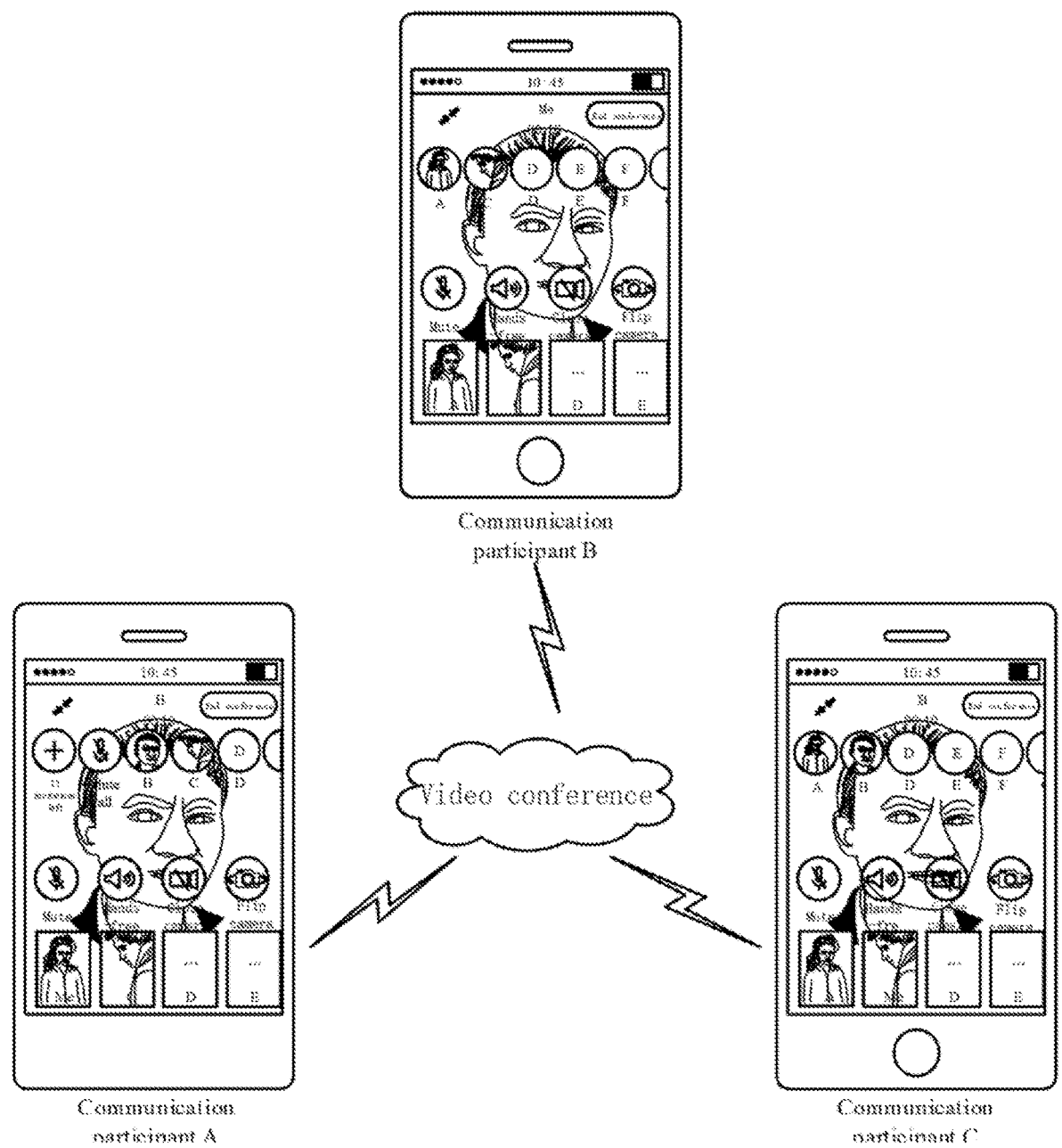

Thus, as illustrated by FIG. 11, only after communication participant A triggers "everyone look at him/her," are video windows corresponding to communication participant B adjusted into master display regions in a unilateral fashion on video communication pages of communication devices employed by communication participants A, B and C. This does not require each communication participant to respectively execute adjustment operations, thus avoiding operation errors and waiting time leading to communication delays or interruptions, and enabling all communication participants to focus at the same time on communication participant B and communication content of communication participant B, helping to improve communication efficiency of video communication.

Figure 9B:
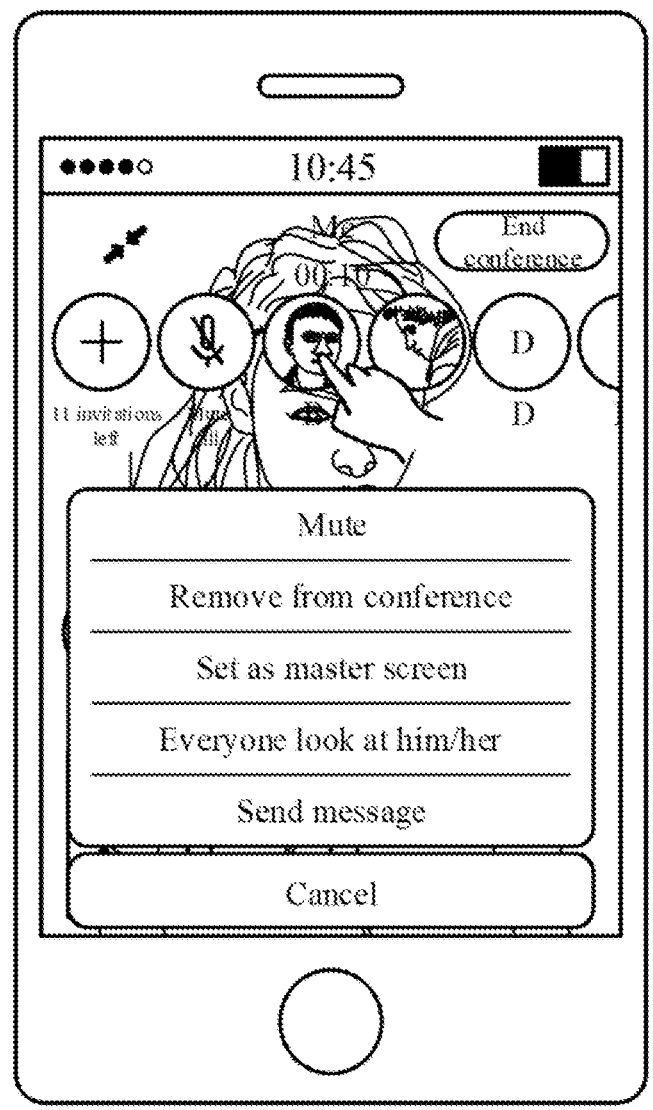

Of course, the manner of operation to trigger the video window corresponding to communication participant B in FIG. 9A is merely an exemplary embodiment; in another exemplary embodiment, as illustrated by FIG. 9B, when portrait identifiers corresponding to each communication participant are further displayed on the video communication page, communication participant A may additionally, by triggering a portrait identifier corresponding to communication participant B, cause the above-mentioned "mute," "remove from conference," "set as master screen," "everyone look at him/her," "send message" and such function options to be shown, allowing communication participant A to further select operations, details of which shall not be reiterated herein.

Step 614, upon the server receiving a window configuration instruction, the server may authenticate identity of the sending party of the window configuration instruction.

According to the present example embodiment, to ensure normal execution of video communication, operation permissions of communication participants may be restricted, so that only a portion of the communication participants may execute video window configuration operations according to the present disclosure. For example, those having operation permissions may include: a video communication initiating party, that is, communication participant A according to the present example embodiment; in corporate settings, based further on permission levels of each communication participant in a corporate organizational structure, communication participants having permission levels greater than a preset level may obtain the operation permission, while communication participants having permission levels not greater than the preset level do not have the operation permission.

Thus, the server may verify an operation permission of the sending party of the window configuration instruction, continue executing subsequent operations in the case where verification passes, and ignore or discard the received window configuration instruction in the case where verification fails.

Of course, step 614 is not a mandatory step. In one aspect, the above-mentioned operation permissions may not be set up with regard to communication participants; in another aspect, when the above-mentioned differences in operation permissions are configured, video communication pages on the communication devices of each communication participant may be configured accordingly based on the operation permissions, causing only those communication participants having operation permissions to be able to view and trigger the "everyone look at him/her" option as illustrated by FIG. 9A, and those communication participants not having operation permissions being unable to trigger or even to view the option, ensuring that the window configuration instruction received by the server is from a communication participant having operation permissions.

Step 616, the server sending the window configuration instruction to communication participant B and such other communication participants (aside from communication participant A).

Step 618, communication devices employed by communication participant B and such who have received the window configuration instruction configuring their video communication pages based on the window configuration instruction.

According to the present example embodiment, suppose that a window configuration instruction contains information of communication participant B, that is, a video window corresponding to communication participant B needs to be adjusted into a master display region.

With regard to communication participant B, upon receiving a window configuration instruction while in the state illustrated by FIG. 8, that is, a video window corresponding to communication participant B is already in a master display region, the display state associated therewith may be maintained.

With regard to communication participant C, upon receiving a window configuration instruction while in the state illustrated by FIG. 8, that is, a video window corresponding to communication participant B is not in a master display region, display content in the master display region may be switched to the video window corresponding to communication participant B corresponding to the video window, replacing the original display content of the master display region (for example, a video window corresponding to communication participant C as in FIG. 8).

Thus, in conjunction with the proactive configuration of a video communication page by communication participant A in step 612, after step 618 completes, video windows corresponding to communication participant B are displayed in master display regions on video communication pages of the communication devices of all communication participants, resulting in the state illustrated by FIG. 11.

Of course, with communication participant B as an example, after the communication device employed by communication participant B receives the window configuration instruction, first a window display prompt may be displayed to communication participant B, providing an independent selection opportunity for communication participant B. The communication device only configures its own video communication page after communication participant B has responded to the window configuration instruction; otherwise, the communication device may not configure its own video communication page.

Step 620, the communication device employed by communication participant B detecting a display switching operation.

Step 622, the communication device employed by communication participant B responding to the display switching operation.

According to the present example embodiment, even if communication participant A, by the above-mentioned example embodiment, implements unilateral management over all communication participants, each communication participant may still independently manually adjust the communication device of that communication participant, to the satisfaction of their individual needs at the time; for example, communication participant B may, by proactively clicking a video window corresponding to communication participant C, cause the video window to switch into a master display region on a video communication page of the communication device employed by communication participant B.

Of course, steps 620-622 are not mandatory; in actuality, to ensure high efficiency of video communication, avoiding operation errors and the like by communication participants, after executing the above-mentioned unilateral management, operation locking may be performed for communication devices employed by all communication participants acting as controlled parties, ensuring unified interactions between all communication participants.

According to the present example embodiment, conditions may be added to restrict the execution of steps 620-622, causing switching adjustments to video windows to be partially compulsory; for example, when any of the below-mentioned conditions are satisfied, operations that would remove a video window corresponding to communication participant B from a display region (such as a master display region) where it is located are restricted:

1) A duration of continuous display of the video window corresponding to the communication participant in the associated display region does not reach a preset duration. For example, communication participant A, by issuing a window configuration instruction, causes the video window corresponding to communication participant B to be displayed in master display regions on communication devices of communication participant B and such other users. Thus, supposing that a preset length is 20 minutes, indicating that the video window corresponding to communication participant B is to be continuously displayed in master display regions for at least 20 minutes, the video window corresponding to participant B is not permitted to be removed from the associated display regions during those 20 minutes, ensuring full mobilization of points of interest of each communication participant.

2) A restriction lifting instruction for the video window corresponding to the communication participant B sent by communication participant A has not been received. According to this example embodiment, communication participant A not only has unilateral management starting permission for the video window corresponding to communication participant B, but also has an associated unilateral management termination permission. That is, only when communication participant A proactively sends a restriction lifting instruction to other communication participants, are the other communication participants permitted to remove the video window corresponding to communication participant B from associated display regions; otherwise, the video window corresponding to communication participant B remains displayed in the associated display regions.

3) Communication participant B has not exited the video communication. According to the present example embodiment, before communication participant B has exited the video communication, the video window corresponding to communication participant B remains displayed in associated display regions, and other communication participants are not permitted to remove the video window corresponding to communication participant B from the associated display regions.

According to the present example embodiment, on the video communication pages illustrated by FIGS. 8 to 11, portrait images of associated communication participants employed by video windows are video images captured by communication devices employed by communication participants; based on normal usage habits of communication participants, the video images usually originate from front cameras of communication devices, though not to exclude that they may originate from rear cameras of communication devices, or from other image capture devices external to the communication devices.

According to other example embodiments, video windows may also be utilized to display other content. For example, video windows may be utilized to display screen display content of associated communication devices. Then, because areas of master display regions are larger than areas of slave display regions, by unilaterally configuring the video windows into master display regions, communication participants are facilitated in viewing the screen display content. Alternatively, the video windows may also be utilized display show contact portraits of associated communication participants and the like, and the present disclosure shall not be limiting thereto.

Figure 12:
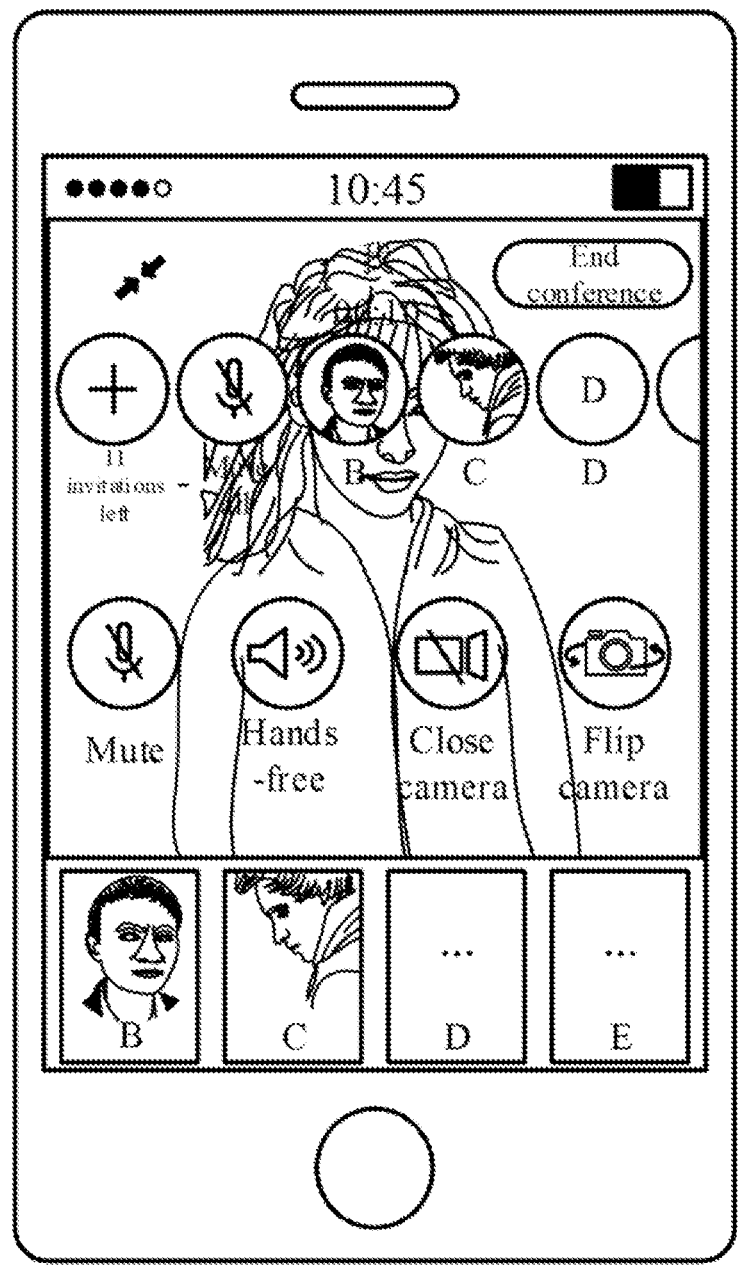

Furthermore, although the above-mentioned example embodiments illustrate a master display region of a video communication page as being a "background region," a master display region may also take other forms. For example, as illustrated by FIG. 12, a master display region and a slave display region may be respectively situated at different locations on a video communication page, the regions not overlapping. For example, the master display region may be a central region of an upper-middle portion, and the slave display region may be an edge region of a lower portion; the present disclosure shall not be limiting thereto.

Figure 13:
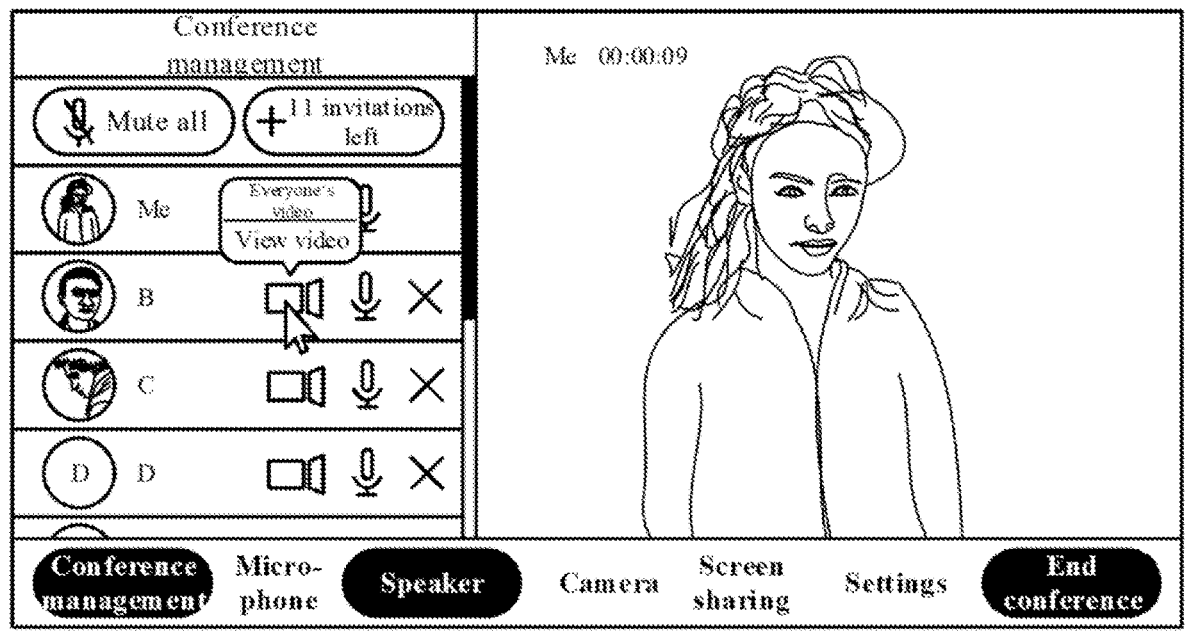
FIGS. 13-14 are diagrams of PC device video communication pages provided by an example embodiment of the present disclosure.
Figure 14:
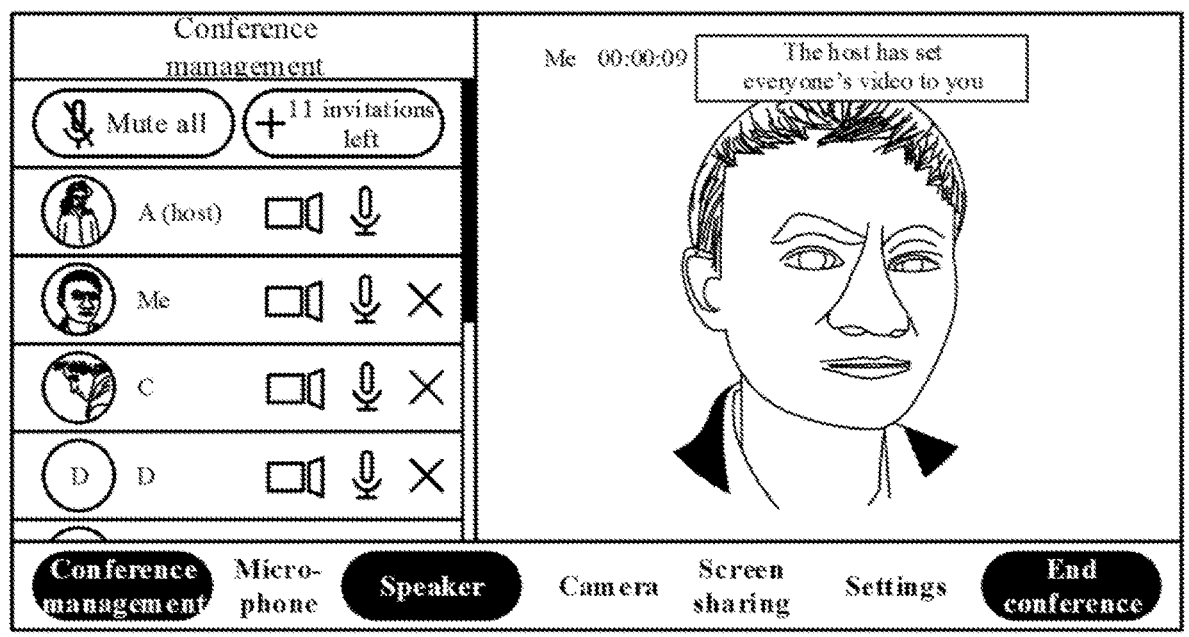

Of course, aside from a mobile device as illustrated by FIGS. 7 to 12, technical solutions of the present disclosure may be applied to any form of electronic device, such as shown by the interface diagrams of FIGS. 13 to 14 of a PC implementing technical solutions of the present disclosure. Herein, FIG. 13 is a PC version of a video communication page of user A acting as a host (that is, an establishing party of a video communication), with a left side of the video communication page showing information of all communication participants, a right side being a display region (displayed in FIG. 13 as a video window corresponding to user A), and a bottom portion having multiple function options therein. Thus, user A may select an arbitrary communication participant at the left side, causing a video window of the arbitrary communication participant to be unilaterally configured into display regions on video communication pages of all communication participants. For example, when user A wishes to configure a video window corresponding to user B, by a mouse click upon a "camera" icon to the right of a portrait of user B, a temporary window as shown in FIG. 13 is triggered, the temporary window containing the two options "everyone's video" and "view video." Herein, when user A triggers "everyone's video," a communication device employed by user A sends a window configuration instruction to other communication participants, causing the video window corresponding to communication participant B to be displayed in display regions on video communication pages of all communication participants; and, when the user triggers "view video," only the communication device of user A displays a video window corresponding to communication participant B in a display region of a video communication page, replacing the video window corresponding to communication participant A displayed on FIG. 13.

Then, after user A triggers the "everyone's video" option on FIG. 13, on video communication pages of all communication participants of the video communication, video windows corresponding to user B are displayed in display regions. For example, FIG. 14 illustrates a video communication page corresponding to the user B. As illustrated by FIG. 14, because it is user B to whom the video window that has been unilaterally configured corresponds, user B may be prompted as to such by a prompt message such as "the host has set everyone's video to you" illustrated by FIG. 14 and the like.

Figure 15:
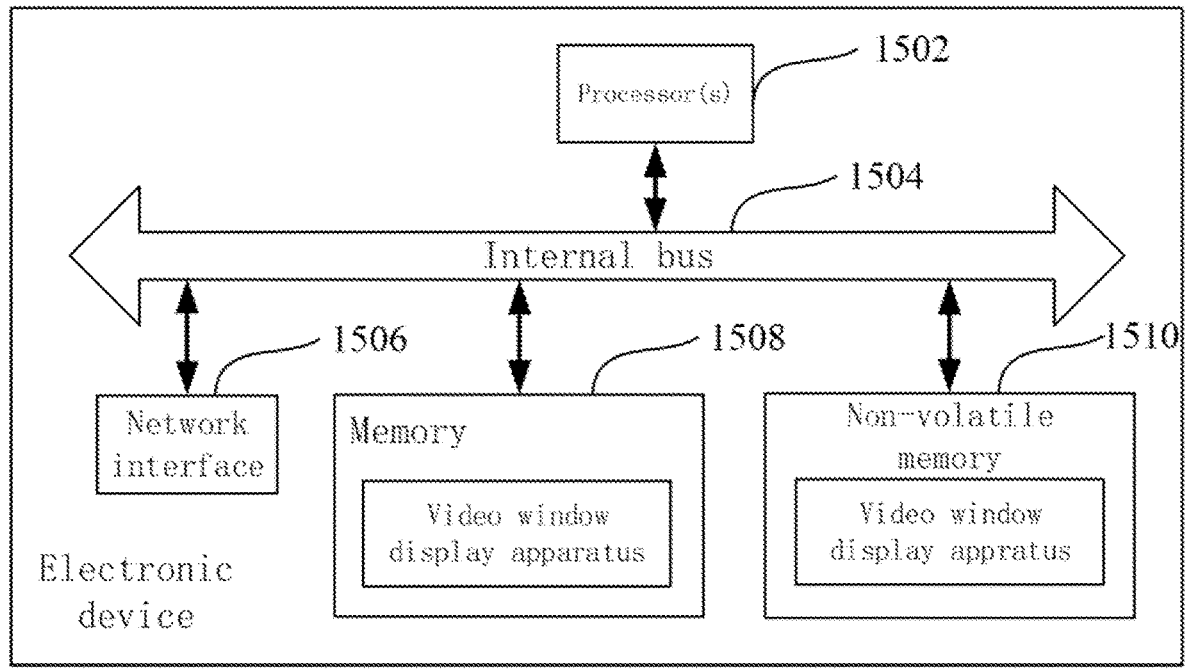
FIG. 15 is a schematic diagram of an electronic device provided by an example embodiment of the present disclosure.

FIG. 15 illustrates a schematic diagram of an electronic device according to an exemplary embodiment according to the present disclosure. Referring to FIG. 15, at a hardware level, the electronic device includes a processor 1502, an internal bus 1504, a network interface 1506, memory 1508 and nonvolatile memory 1510, and may, of course, include hardware required for other services. The processor 1502 reads, from the nonvolatile memory 1510, a corresponding computer program into the memory 1508 and runs it, forming a video window display apparatus at a logical level. Of course, the present disclosure does not exclude implementations such as logic devices, a combination of hardware and software, and the like, which is to say that the main execution body of the below processing flow is not limited to the respective logical units, but may also be hardware or logic devices.

Figure 16:
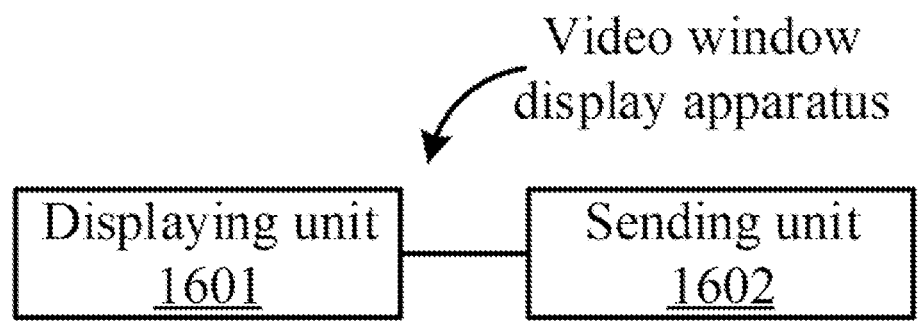
FIG. 16 is a block diagram of a video window display apparatus provided by an example embodiment of the present disclosure.

Referring to FIG. 16, the video window display apparatus may be implemented on the electronic device of FIG. 15, and may further include a displaying unit 1601 and a sending unit 1602. Herein:

The displaying unit 1601 is stored in the memory 1508 and configured to be executable by the processor 1502 to, during a video communication, display video windows corresponding to at least a portion of communication participants in an associated display region on a video communication page;

The sending unit 1602 is stored in the memory 1508 and configured to be executable by the processor 1502 to, upon detecting a display configuration operation with regard to an arbitrary communication participant, send a window configuration instruction to all communication participants, causing video windows corresponding to the arbitrary communication participant to be displayed in display regions on communication devices employed by all communication participants.

Optionally, the display region includes a master display region and a slave display region, and the video windows corresponding to at least a portion of communication participants are respectively displayed in the master display region and the slave display region.

Optionally, the master display region has an area larger than the slave display region.

Optionally, the master display region is a central region or a background region of the video communication page, and the slave display region is an edge region of the video communication page.

Optionally, video windows corresponding to the arbitrary communication participant are displayed in master display regions on video communication pages of the communication devices of all communication participants.

Optionally, the video window is utilized to display at least one of the following items of information:

A video image captured by a communication device employed by an associated communication participant;

Screen display content of the communication device;

A contact portrait of the associated communication participant.

Figure 17:
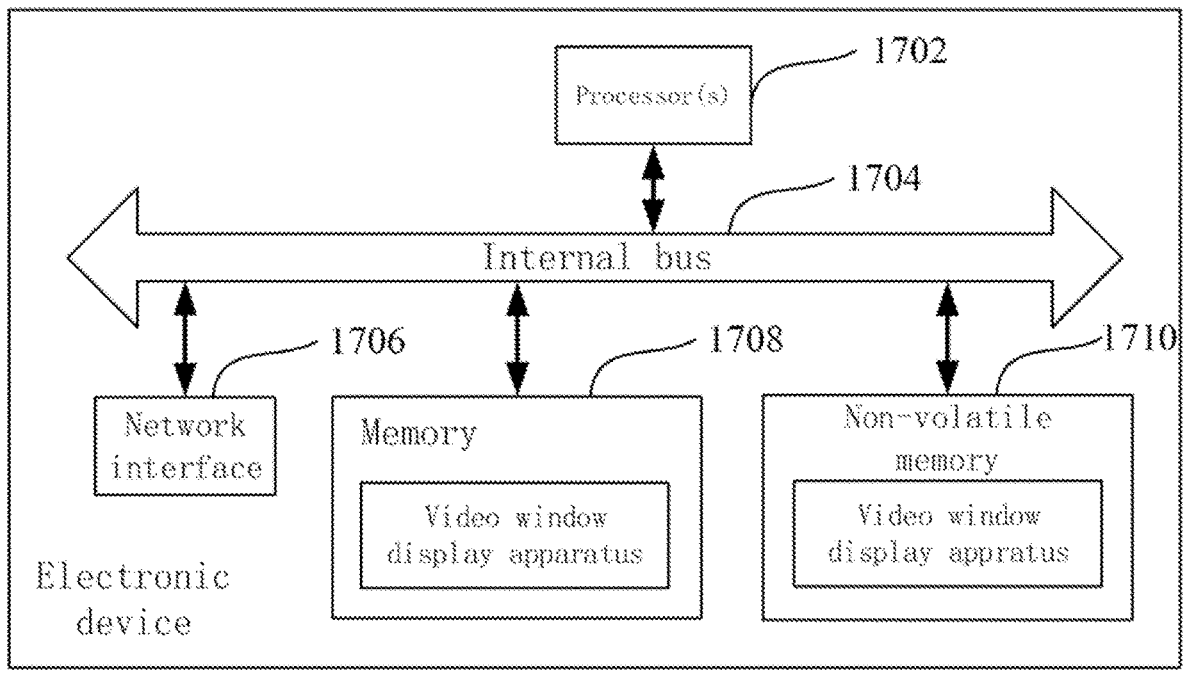
FIG. 17 is a schematic diagram of an electronic device provided by an example embodiment of the present disclosure.

FIG. 17 illustrates a schematic diagram of an electronic device according to an exemplary embodiment of the present disclosure. Referring to FIG. 17, at the hardware level, the electronic device includes a processor 1702, an internal bus 1704, a network interface 1706, memory 1708 and nonvolatile memory 1710, and may, of course, include hardware required for other services. The processor 1702 reads, from the nonvolatile memory 1710, a corresponding computer program into the memory 1708 and runs it, forming a video window display apparatus at a logical level. Of course, the present disclosure does not exclude implementations such as logic devices, a combination of hardware and software, and the like, which is to say that the main execution body of the below processing flow is not limited to the respective logical units, but may also be hardware or logic devices.

Figure 18:
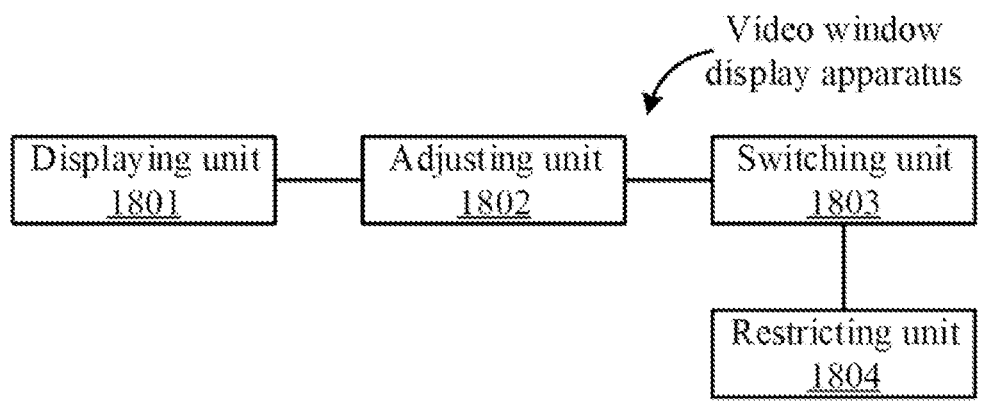
FIG. 18 is a block diagram of a video window display apparatus provided by an example embodiment of the present disclosure.

Referring to FIG. 18, the video window display apparatus may be implemented on the electronic device of FIG. 17, and may further include a displaying unit 1801 and an adjusting unit 1802. Herein:

The displaying unit 1801 is stored in the memory 1708 and configured to be executable by the processor 1702 to, during a video communication process, display video windows corresponding to at least a portion of communication participants in an associated display region on a video communication page;

The adjusting unit 1802 is stored in the memory 1708 and configured to be executable by the processor 1702 to, upon receiving a window configuration instruction sent by a particular communication participant with regard to an arbitrary communication participant, display a video window corresponding to the arbitrary communication participant in the display region.

Optionally, the adjusting unit 1802 is configured to:

Upon receiving the window configuration instruction sent by the particular communication participant with regard to the arbitrary communication participant, display a window display prompt;

Upon the window display prompt being responded to, display a video window corresponding to the arbitrary communication participant in the display region.

Optionally, the display region includes a master display region and a slave display region; and the adjusting unit 1802 is configured to:

Display the video window corresponding to the arbitrary communication participant in the master display region.

Optionally, further included is:

A switching unit 1803 stored in the memory 1708 and configured to be executable by the processor 1702 to, upon detecting a display switching operation with regard to another communication participant, switch display contents in the master display region to the video window corresponding to the other communication participant, replacing the video window corresponding to the arbitrary communication participant.

Optionally, further included is:

A restricting unit 1804 stored in the memory 1708 and configured to be executable by the processor 1702 to, in the case where any of the following conditions are satisfied, restrict operations removing the video window corresponding to the arbitrary communication participant from the display region:

A duration of continuous display of the video window corresponding to the arbitrary communication participant in the display region does not reach a preset duration;

A restriction lifting instruction for the video window corresponding to the arbitrary communication participant sent by the particular communication participant has not been received;

The arbitrary communication participant has not exited the video communication.

Figure 19:
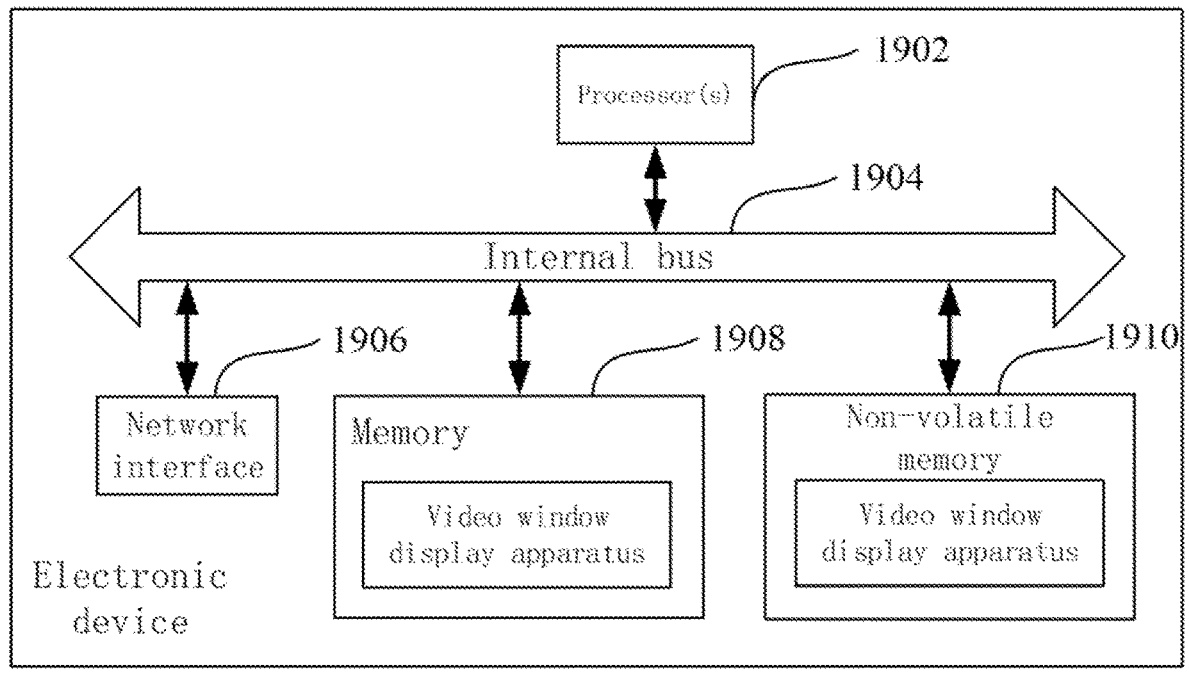
FIG. 19 is a schematic diagram of an electronic device provided by an example embodiment of the present disclosure.

FIG. 19 illustrates a schematic diagram of an electronic device according to an exemplary embodiment of the present disclosure. Referring to FIG. 19, at the hardware level, the electronic device includes a processor 1902, an internal bus 1904, a network interface 1906, memory 1908 and nonvolatile memory 1910, and may, of course, include hardware required for other services. The processor 1902 reads, from the nonvolatile memory 1910, a corresponding computer program into the memory 1908 and runs it, forming a video window display apparatus at a logical level. Of course, the present disclosure does not exclude implementations such as logic devices, a combination of hardware and software, and the like, which is to say that the main execution body of the below processing flow is not limited to the respective logical units, but may also be hardware or logic devices.

Figure 20:
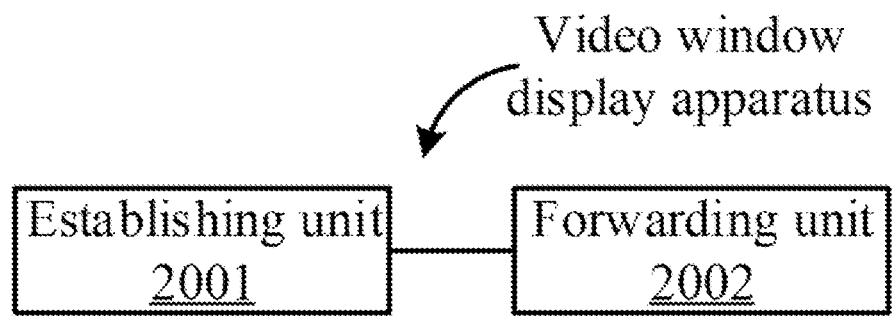
FIG. 20 is a block diagram of a video window display apparatus provided by an example embodiment of the present disclosure.

Referring to FIG. 20, the video window display apparatus may be implemented on the electronic device of FIG. 19, and may further include an establishing unit 2001 and a forwarding unit 2002. Herein:

The establishing unit 2001 is stored in the memory 1908 and configured to be executable by the processor 1902 to establish a video communication, causing communication devices employed by communication participants to display video communication pages, video windows corresponding to at least a portion of communication participants being displayed in associated display regions on the video communication pages.

The forwarding unit 2002 is stored in the memory 1908 and configured to be executable by the processor 1902 to, upon receiving a window configuration instruction sent by a particular communication participant with regard to an arbitrary communication participant, forward the window configuration instruction to other communication participants aside from the particular communication participant, causing video windows corresponding to the arbitrary communication participant to be displayed in display regions on communication devices employed by the other communication participants.

Optionally, the particular communication participant includes an initiating party of the video communication.

Optionally, when the display regions include a master display region and a slave display region, video windows corresponding to the arbitrary communication participant are displayed in master display regions on the communication devices employed by the other communication participants.

According to a typical configuration, a computing device includes one or more processors (CPU), input/output interfaces, network interfaces, and memory.

The memory may include a form of computer-readable media such as a volatile memory, a random access memory (RAM) and/or a nonvolatile memory, for example, a read only memory (ROM) or a flash RAM. The memory is an example of computer-readable memory medium.

The computer-readable media include a volatile or non-volatile type, a removable or non-removable media, which may achieve storage of information using any method or technology. The information may include a computer-readable instruction, a data structure, a program module or other data. Examples of computer-storage media include, but are not limited to, phase-change memory (PRAM), static random access memory (SRAM), dynamic random access memory (DRAM), other types of random-access memory (RAM), read-only memory (ROM), electrically erasable programmable read only memory (EEPROM), quick flash memory or other memory technology, compact disc read-only memory (CD-ROM), digital versatile disc (DVD) or other optical storage, magnetic cassette tape, magnetic disk storage or other magnetic storage devices, or any other non-transmission medium, which may be used to store information that may be accessed by computing device. As defined herein, the computer-readable media does not include transitory media, such as modulated data signals and carrier waves.

It should be further noted that the terms "include," "containing," "comprising," or any other variation thereof, are intended to cover non-exclusive inclusion, so that a process, method, article, or device including a series of elements does not only include those elements, but further include other elements not expressly listed, or further includes inherent elements of such processes, methods, articles, or devices. Where no additional limitation is made, an element defined by the wording "including a . . . " does not exclude other same elements being present in a process, method, article, or device including the element.

Herein, exemplary embodiments are described in detail and expressed by illustration in the drawings. Where the above description refers to the drawings, unless otherwise indicated, the same numbers in different drawings indicate the same or similar elements. Manners of implementation described in the above exemplary embodiments do not represent all manners of implementation consistent with the present disclosure. To the contrary, they are merely examples of apparatuses and methods consistent with some aspects of the invention, as recited by the attached claims.

Terminology employed by the present disclosure is merely for the purpose of describing particular example embodiments, and is not intended to limit the present disclosure. The singular forms "a," "an," and "the" employed in the present disclosure and the attached claims are also intended to include plural forms unless the overall context clearly indicates other meaning. It should also be understood that the term "and/or" employed in this text refers to and includes any or all possible combinations of one or more of the associated listed subject matter.

It should be understood that, although the present disclosure may employ the language "first," "second," "third" and the like to describe a variety of information, this information should not be limited by this language. This language is merely used to distinguish information of a same type from one another. For example, without departing from the scope of the present disclosure, "first information" may also be designated as "second information," and, similarly, "second information" may also be designated as "first information." Depending on the context, as used herein, the word "if" may be interpreted as "when . . . " or "upon . . . " or "in response to determining."

The foregoing is merely preferred embodiments of the present disclosure, not intended to limit the present disclosure, and any modifications, equivalent substitutes, improvements, and the like, made within the spirit and principles of the disclosure shall be included within the scope of protection of the present disclosure.

What is claimed is:

1. A video window display method, comprising:
   displaying, during a video communication process, video windows corresponding to one or more communication participants in an associated display region on a video communication page;
   detecting a display configuration operation with regard to a communication participant;
   upon authenticating identity of the communication participant:
      sending a window configuration instruction to all communication participants;
      causing a window display prompt to be displayed on communication devices employed by all communication participants; and
      causing a video window corresponding to the communication participant to be displayed in display regions on communication devices employed by communication participants responding to the window display prompt.

2. The method of claim 1, wherein display regions comprise a master display region and a slave display region, and at least one first video window and at least one second video window of the video windows corresponding to the one or more communication participants are respectively displayed in master display regions and slave display regions.

3. The method of claim 2, wherein the master display region has an area larger than the slave display region.

4. The method of claim 2, wherein the master display region is one of a central region or a background region of the video communication page, and the slave display region is an edge region of the video communication page.

5. The method of claim 2, wherein video windows corresponding to the communication participant are displayed in master display regions.

6. The method of claim 1, wherein each video window is utilized to display at least one of:
a video image captured by a communication device employed by an associated communication participant;
screen display content of the communication device; and
a contact portrait of the associated communication participant.

7. A video window display method, comprising:
displaying, during a video communication process, video windows corresponding to one or more communication participants in an associated display region on a video communication page;
receiving a window configuration instruction sent by a particular communication participant with regard to a communication participant;
upon authenticating identity of the particular communication participant:
displaying a window display prompt; and
displaying, upon the window display prompt being responded to, a video window corresponding to the communication participant in the display region.

8. The method of claim 7, wherein the display region comprises a master display region and a slave display region; and displaying the video window corresponding to the communication participant in the display region comprises:
displaying the video window corresponding to the communication participant in the master display region.

9. The method of claim 7, further comprising:
switching, upon detecting a display switching operation with regard to another communication participant, display contents in the display region to the video window corresponding to the other communication participant, replacing the video window corresponding to the communication participant.

10. The method of claim 9, further comprising restricting operations removing the video window corresponding to the arbitrary communication participant from the display region while a duration of continuous display of the video window corresponding to the communication participant in the display region does not reach a preset duration.

11. A video window display apparatus, comprising:
a displaying unit configured to display, during a video communication, video windows corresponding to one or more communication participants in an associated display region on a video communication page; and
a sending unit configured to, upon detecting a display configuration operation with regard to a communication participant and receiving an authentication of identity of the communication participant:
send a window configuration instruction to all communication participants,
cause a window display prompt to be displayed on communication devices employed by all communication participants, and
cause a video window corresponding to the communication participant to be displayed in display regions on communication devices employed by communication participants responding to the window display prompt.

12. The apparatus of claim 11, wherein the display region comprises a master display region and a slave display region, and at least one first video window and at least one second video window of the video windows corresponding to one or more communication participants are respectively displayed in the master display region and the slave display region.

13. The apparatus of claim 12, wherein the master display region has an area larger than the slave display region.

14. The apparatus of claim 12, wherein the master display region is one of a central region or a background region of the video communication page, and the slave display region is an edge region of the video communication page.

15. The apparatus of claim 12, wherein video windows corresponding to the communication participant are displayed in master display regions on video communication pages of the communication devices of all communication participants.

16. The apparatus of claim 11, wherein each video window is utilized to display at least one of:
a video image captured by a communication device employed by an associated communication participant of the respective video window;
screen display content of the communication device; and
a contact portrait of the associated communication participant.

17. The method of claim 9, further comprising restricting operations removing the video window corresponding to the communication participant from the display region while a restriction lifting instruction for the video window corresponding to the communication participant sent by the particular communication participant has not been received.

18. The method of claim 9, further comprising restricting operations removing the video window corresponding to the communication participant from the display region while the communication participant has not exited the video communication.

19. The method of claim 7, wherein displaying, upon receiving a window configuration instruction sent by a particular communication participant with regard to a communication participant, a video window corresponding to the communication participant in the display region comprises:
maintaining a state wherein a video window corresponding to the communication participant is already in the display region.

* * * * *